United States Patent Office 3,502,475
Patented Mar. 24, 1970

3,502,475
HIGHLY ADHERENT COATED FILMS AND
METHOD OF PRODUCING SAME
William Paul Kane, Bon Air, Va., assignor to E. I. du Pont de Nemours and Company, Wilmington, Del., a corporation of Delaware
No Drawing. Filed July 13, 1967, Ser. No. 653,046
Int. Cl. G03c 1/78
U.S. Cl. 96—87
12 Claims

ABSTRACT OF THE DISCLOSURE

A process for producing coated highly adherent films by applying to at least one treated surface of the film an aqueous dispersion of a copolymer of an ethylenically unsaturated arylene monoisocyanate with at least one other ethylenically unsaturated monomer (e.g., the copolymer of substituted isopropenyl benzyl isocyanates with acrylates). And, as new products of manufacture polyolefin or polyester films coated with the above aqueous dispersion and bearing a topcoat of a vinylidene chloride copolymer or a light sensitive photographic emulsion, respectively.

---

Coated polyolefin films, particularly those coated with vinylidene chloride copolymer coatings, have been found to be useful in a variety of packaging applications. However, for the packaging of certain items such as those of relatively high water content wherein the coated film is subjected to a high moisture condition such films have been found to have serious shortcomings in that the coating tends to loosen or delaminate from the base layer. Various solutions have been proposed to overcome these shortcomings including the use of priming systems, particularly those containing reactive diisocyanates or alkylene imines. Such compositions, however, require the use of an organic solvent to avoid premature reaction of the reactive agent which would occur in aqueous dispersions.

The use of polyester film bases in the photographic arts has been also handicapped to a considerable extent by the difficulty of suitable adhering the photographic emulsion layers to the polyester film surface. It is known to apply a sub coat system such as a vinylidene chloride/ methyl acrylate/itaconic acid copolymer followed by a layer of gelatin. These subcoats are satisfactory for some purposes, but in other instances the degree of adhesion of the subsequently applied photographic emulsion is inadequate. Also, the system described above entails a separate subcoating operation which adds to the expense of producing the photographic film.

According to the present invention there is provided a method for producing highly adherent coated polyolefin and polyester films which method comprises applying to at least one surface of the film which has been treated for adherability an aqueous dispersion of a copolymer of from about 1% to about 50% by weight of an ethylenically unsaturated arylene monoisocyanate of the formula:

$$CH_2=C(R)—Arylene—C(RR')—N=C=O$$

wherein arylene is a divalent aromatic hydrocarbon group of up to 10 carbon atoms and R and R' are selected from the group consisting of hydrogen and alkyl groups containing from 1 to 12 carbon atoms, with at least one other ethylenically unsaturated monomer copolymerizable therewith and thereafter heating said coated film to the curing temperature of the copolymer to provide a well bonded coating.

The invention is further illustrated in the description to follow.

The process of the present invention for improving the adhesion between the coating and the film base can be practiced on polyolefin films, such as polyethylene, polypropylene, polyvinyl fluoride, polyvinyl chloride, aromatic polyimides, regenerated cellulose, polyvinyl alcohol, polyvinyl acetate, higher olefins, copolymers and blends thereof, usually biaxially oriented by a suitable process to give the desired strength characteristics required for a packaging materail. It is also applicable to polyester films derived from alkylene glycols and aromatic dicarboxylic acids, such as polyethylene terephthalate and polyethylene isophthalate. Again, the polyester films generally applied are biaxially oriented and heat set by a conventional method.

In order to obtain better adherability the surface of the film which is to be coated should be first treated by one of the conventional surface activating methods, such as the flame treatment described in British Patent 1,010,649, or the electrical discharge treatment described in U.S. Patent 3,018,189, or a chlorination treatment as described in U.S. Patent 2,502,841.

The preparation of the isocyanates and the aqueous dispersions of their copolymers is described in detail in Hoover U.S. Patent 3,290,350 and in copending application Hoover S.N. 559,393 filed June 22, 1966, now abandoned. The copolymers applied to the treated film surfaces are produced from monoisocyanates of the formula:

$$CH_2=C(R)—Arylene—C(RR')—N=C=O$$

wherein the arylene radical contains up to 10 carbon atoms, but preferably containing 6 to 7 carbons as in phenylene and methylphenylene, and R and R' are selected from the group consisting of hydrogen and alkyl groups containing from 1 to 12 carbon atoms as in methyl, ethyl, propyl, benzyl, cyclopentyl, cyclohexyl, decyl, etc., but preferably not more than 6 carbons. Still further preferred are the substituted para- and meta-isopropenyl benzyl isocyanates wherein said benzyl isocyanates are substituted on the isocyanate bearing carbon atom with at least one alkyl group containing from 1 to 6 carbon atoms. Typical of the isocyanate monomers are $\alpha,\alpha$-dimethyl-para-isopropenyl benzyl isocyanate, $\alpha,\alpha$-diethyl-para-isopropenyl benyl isocyanate, $\alpha,\alpha$-dipropyl-meta-isopropenyl benzyl isocyanate, $\alpha,\alpha$-dimethyl-meta-isopropenyl benzyl isocyanate, $\alpha,\alpha$-dimethyl-para-vinyl benzyl isocyanate, $\alpha,\alpha$-methylortho-vinyl benzyl isocyanate, $\alpha$-methyl, $\alpha$-hexyl-meta(1-hexyl vinyl) benzyl isocyanate, $\alpha$-methyl, $\alpha$-decyl-para(1-decyl vinyl) benzyl isocyanate, etc.

The isocyanate monomer should amount to from about 1% to about 50% of the total weight of the copolymer. Lesser amounts will not result in the desired adhesion, whereas higher concentrations will undesirably embrittle the coating. The preferred concentration range is between 5% and 25%.

Representative of other ethylenically unsaturated comonomers copolymerizable with the isocyanates are vinylidene chloride, acrylic esters, such as methyl acrylate, ethyl acrylate, 2-ethyl hexyl acrylate, etc., alkacrylic esters such as methyl methacrylate, butyl methacrylate, etc., vinyl chloride/vinyl acetate, vinyl chloride/acrylic and alkacrylic esters, vinyl acetate, styrene/butadiene, acrylic acid, methacrylic acid, etc. The preferred comonomers are vinylidene chloride, alkyl acrylates and alkyl methacrylates, the alkyl group having from 1 to 8 carbon atoms.

Preferably the copolymers of the aqueous dispersion have a high enough molecular weight to be film forming.

The aqueous dispersion of the above described copolymers can be applied to the base film by conventional methods, such as air knife, doctor roll application, kiss coating, doctor knife coating, and spray application.

It is necessary to deposit on a dried solids basis between 0.5 gram and 2 grams per square meter of the subcoat on the surface. No particular advantage is gained from using a much heavier subcoat than this whereas in amounts in the order of 0.3 gram per square meter the adhesion of the subsequently applied topcoating is inadequate.

The resulting coated film is then heated for approximately one minute to give a firmly adhered subcoat layer. The heating temperature should be at least about 70° C. and, to avoid damaging the base film the heating temperature should not exceed its softening point; about 140° C. for polyolefin films, whereas the coated oriented polyester films are advantageously heated at a temperature of between about 100° C. and about 175° C., preferably between about 140° C. and about 165° C. Of course this consideration does not apply to films coated before stretching and heat treated subsequently at the heat set temperatures which, for example for polyester films, may be above 190° C.

The aqueous dispersion of the above copolymers can be applied as a subcoating to be followed by the desired topcoat, which in the case of polyolefin film bases could be copolymers of vinylidene chloride with vinyl chloride, esters of acrylic and methacrylic acids, vinyl esters, unsaturated acids, acrylonitrile, methacrylonitrile and copolymers of ethylene with vinyl esters. A preferred topcoating is the copolymer of between 70% to 95% vinylidene chloride with at least one monomer selected from esters of acrylic and methacrylic acid, and unsaturated acids selected from acrylic and methacrylic acids. On the other hand, moisture resistant adhesive bonds can also be developed between the coating and a polyolefin film base without a separate subcoating step by incorporating the above described arylene monoisocyanates as a co-monomer for the aqueous dispersion of the copolymer intended as a coating for the polyolefin film.

For example, if it is desired to coat a polyolefin film with a vinylidene chloride/acrylonitrile copolymer, one only needs to prepare an aqueous dispersion of a vinylidene chloride/acrylonitrile/monoisocyanate copolymer by a one-stage or two-stage polymerization process and apply this aqueous dispersion to the polyolefin film directly.

In the preparation of polyester based photographic films the aqueous dispersion should be applied as a separate subcoating. In addition to the isocyanate copolymer the dispersion may contain from about 20% to about 30% gelatin. The topcoating can be any of the conventional light sensitive photographic emulsions, for example X-ray emulsions, pure silver bromide, pure silver chloride, silver iodobromide, silver chlorobromide and silver iodochlorobromide emulsions.

The principle and practice of the present invention is further illustrated in the following examples. All parts and percentages are by weight.

EXAMPLE 1

Use of copolymer of unsaturated arylene monoisocyanate as a subcoat under vinylidene chloride copolymer topcoat An aqueous disperseion of an 80/20 methyl acrylate copolymer with α,α-dimethyl-para-isopropenyl benzyl isocyanate is prepared by reacting 20 grams of methyl acrylate and 5 grams of the unsaturated isocyanate in 300 milliliters of water and 20 grams of sodium lauryl sulfate under the influence of the initiator system consisting of 0.1 gram of potassium persulfate and 0.3 gram of meta sodium bisulfite in 0.2 gram of water. The mixture is brought to 40° C. and held at that temperature for 6 hours. The resulting translucent dispersion containing 8% solids of the above-identified copolymer is filtered and hereafter applied to a 1 mil thick film of biaxially oriented polypropylene film previously flame treated for adherability following the procedure of British Patent 1,010,649 at a fuel equivalence ratio of 1.05 and with a drum temperature of 55° C. A coating of an aqueous dispersion of a vinylidene chloride/methylmethacrylate/acrylic acid copolymer (88/10/2) is applied to the subcoated film and dried. The coated film after immersion in water at 45° C. for 16 hours shows "no peel" values, that is, the coating cannot be peeled from the base layer. The peel test is conducted by trying to lift the coating from the base layer with a sharp edged instrument, such as a knife. If the coating cannot be lifted without rupture of the coating itself, the bond is labelled "no peel" (N.P.) or "cannot peel" (C.N.P.) A control film without the subcoat described above shows substantially no adhesion when subjected to the same water immersion test. Results similar to those of the test film are obtained when the subcoating dispersion is aged for 1 day and for 10 days before application to the polypropylene film.

EXAMPLE 2

Evaluation of various copolymers of the unsaturated arylene monoisocyanate as subcoating compositions Following the general procedure described in Example 1 subcoating copolymers are prepared as noted in the table to follow. The subcoated films are coated with the vinylidene chloride copolymer of Example 1 and the resulting coated film is tested for anchorage. The results are shown in the table to follow:

| Experiment | Subcoat Composition | Anchorage (16 hr. −45° C. water) |
|---|---|---|
| 1 | Butadiene/styrene/XMI (72/14/14) | No peel. |
| 2 | Butadiene/XMI (72/28) | Do. |
| 3 | Butadiene/acrylonitrile/XMI (72/14/14) | Do. |

XMI=α,α-dimethyl-meta-isopropenyl benzyl isocyanate.

EXAMPLE 3

Vinylidene chloride copolymer topcoat containing unsaturated arylene monoisocyanate A 45% solids vinylidene chloride/acrylonitrile/α,α-dimethyl-para-isopropenyl benzyl isocyanate (90/6/4) aqueous dispersion is prepared following the procedure described in Example 1 by reacting 81 grams vinylidene chloride, 5.4 grams acrylonitrile, 3.6 grams α,α-dimethyl-para-isopropenyl benzyl isocyanate 110 milliliters water, 0.8 gram ammonium persulfate and 1.5 grams meta sodium bisulfite. This aqueous dispersion is coated on a biaxially oriented flame treated polypropylene film. The resulting coated film when subjected to boiling water immersion for 1½ hours shows no peel of the coating. A control film made without the unstaturated isocyanate ingredient in the copolymer showed essentially no adhesion when subjected to the same test.

EXAMPLE 4

Two stage vinylidene chloride copolymers containing unsaturated arylene monoisocyanate Following the general polymerization procedure of Example 1, 45% solids content, two stage polymers are prepared and coated on biaxially oriented, flame treated polypropylene film. A two stage vinylidene chloride copolymer comprising 80 parts of a first stage consisting of a vinylident chloride/ethyl acrylate/XMI (90/6/4) and 20 parts of a second stage copolymer comprising a vinylidene chloride/methylacrylate/XMI (76/20/4) when coated on the polypropylene film and subjected to boiling water for 4 hours shows "no peel" adhesion. A two stage polymer comprising 80 parts of a first stage consisting of vinylidene chloride/ethylacrylate/XMI (90/6/4) and 20 parts of a second state consisting of vinylidene/chloride/methylacrylate/acrylic acid (76/20/4) and coated on a similar film and subjected to boiling water immersion for 4 hours likewise shows "no peel" of the coating. Control films wherein the XMI ingredient of the copolymer is replaced by acrylic acid show substantially no adhesion of the coating when the coated film is subjected to the same boiling water immersion test.

Legend: XMI=α,α-dimethyl-para-isopropenyl benzy isocyanate.

EXAMPLE 5

Subcoat of ethyl acrylate/α,α-dimethyl-p-isopropenyl benzyl isocyanate copolymer with gelatin This copolymer is made by reacting 40 grams of ethyl acrylate with 10 grams of the unsaturated isocyanate, in 600 grams of water held at 40° C. and in the presence of 0.19 gram of potassium persulfate and 0.5 gram of meta sodium bisulfite. The resulting aqueous dispersion containing approximately 10% solids is mixed with gelatin at a ratio of 3 grams of gelatin to 12 grams of the copolymer and is applied to a biaxially oriented polyethylene terephthalate film which had been subjected to an electrical discharge treatment following the general method of U.S. Patent 3,018,189. The amount of coating is about 1.5 grams per square meter. The coated film is dried at 160° C. for 1 minute and is thereafter tested for adhesion by a standard dry anchorage test as outlined below. There is no evidence of any of the subcoat layer being stripped from the polyester film base by this test. In a further experiment a layer of light sensitive silver halide photographic emulsion is applied to the subcoated surface and dried. The photographic emulsion is likewise firmly adhered to the subcoat surfaces as indicated by obtaining grade "excellent" in the standard dry anchorage test which consists of first scoring the coating with a phonograph needle to produce parallel scratches through the photographic emulsion layer ¼ inch apart. A series of lines is then scored across these lines at an angle of 60 degrees and ¼ inch apart to produce rhomboid figures scratched in the emulsion. A piece of pressure-sensitive cellophane adhesive tape is then pressed down over the scored area and a loose end of the tape is grasped at a 90 degree angle to the film surface. The tape is pulled up briskly and an arbitrary measure of adhesion is obtained by comparing with a graded series of standards prepared with films having excellent, good, fair and poor anchorage. The wet anchorage test consists of first immersing the sample for 5 minutes in a 20° C. bath of a 1:1 mixture of Litho Developer 21.D Part A and Part B, respectively, available from E. I. du Pont de Nemours and Company, then rinsing the sample with cold water followed by a 2½ minutes immersion in a 20° C. bath of 18–F Universal Fixer, available from E. I. du Pont de Nemours and Company. The sample is then held under fresh running water at 20° C. for 15 minutes. Immediately following two parallel lines running in the machine direction are scribed on the emulsion coated film sample. Then a squeegee is applied 4 times across the scribed lines and the amount of coating removed is determined. The amount of coating removed is then compared with a graded series of standards prepared with films having excellent, good, fair and poor anchorage. The above coated film gives grade excellent in this wet anchorage test.

In a control experiment a subcoat layer comprising a vinylidene chloride/methyl acrylate/itaconic acid copolymer (88/10/2) is applied to an electrical discharge treated polyethylene terephthalate film followed by a layer of gelatin and the resulting subcoated film is dried. On subjecting to the same wet and dry anchorage tests as described above the results are not better than the ones obtained by the single subcoat of the present invention.

EXAMPLE 6

Subcoat based on copolymer of methyl acrylate/α,α-dimethyl-p-isopropenyl benzyl isocyanate with gelatin Following the polymerization procedure described in Example 5, and 80/20 copolymer of methyl acrylate with α,α-dimethyl-p-isopropenyl benzyl monoisocyanate is prepared. The resulting aqueous dispersion is mixed with gelatin in the ratio of 4 grams of gelatin to 12 grams of the copolymer and is applied to an oriented polyethylene terephthalate film which has been treated by an electrical discharge as described in Example 5. The resulting subcoated film after drying at 160° C. for 1 minute showed no removal of the emulsion coating when subjected to the standard dry anchorage test.

In addition experiments wherein the amount of the gelatin containing copolymer dispersion is applied to the treated polyethylene terephthalate base layer in amounts less than 0.3 gram per square meter it is observed that the adhesion of the subcoat to the polyester base layer is deficient as indicated by stripping of the emulsion layer when tested in the standard dry anchorage test. Adhesion appears to be entirely adequate when amounts in the order of 1 to 2 grams per square meter are applied. No disadvantage is observed in the use of heavier subcoates, however, it is of advantage economically to use no more than necessary to provide the required adhesion.

EXAMPLE 7

The following ingredients are mixed in a glass flask fitted with a reflux condenser, stirrer, thermometer, and nitrogen purge system:

| | Parts |
|---|---|
| Water | 210 |
| Sodium lauryl sulfate (28% aqueous) | 4 |
| Ferrous sulfate (0.1% aqueous) | 25 |
| Methyl acrylate | 94 |
| Diallyl phthalate | 10 |
| α,α-Dimethyl-para-isopropenyl benzyl isocyanate | 6 |

The mixture is purged with nitrogen and heated to 35° C. under nitrogen with constant stirring. The following materials are then added in the order listed:

| | Parts |
|---|---|
| Sodium formaldehyde sulfoxylate | 0.2 |
| Ammonium persulfate | 0.3 |
| t-Butyl hydroperoxide | 0.3 |

The addition results in an immediate reaction and the flask is cooled as rapidly as possible to 35° C. The resulting polymer latex is poured from the flask and diluted to 10% solids with additional water.

A polyethylene terephthalate film .007 inch thick which had been biaxially oriented about 3 times by 3 times longitudinally and laterally and heat set in the manner known to the art, is subjected to electrical discharge after the manner described in Travers U.S. Patent 3,113,208. The rods are charged by a high voltage generator at 1.4 amperes, 1100 watts, and 10,000 volts. This film is then skim coated at 95° F. with the latex prepared as described above. The coating is dried and cured for 2 minutes at 150° C. No gelatin substratum is applied.

A control film of polyethylene terephthalate is coated with a vinylidene chloride/methyl acrylate/itaconic acid copolymer before stretching and then stretched and heat treated as described in Example IV of Alles U.S. Patent 2,779,684 and coated with a conventional gelatin substratum as known to the art.

Both films are coated with a high speed gelatino, silver iodobromide emulsion in which the halides are 1.2% iodide and 98.8% bromide of the type used in medical X-ray photography in the conventional manner. The anchorage of the emulsion, both wet and dry, to both films is equally satisfactory. Both films are then exposed to X-rays through a 2 aluminum step wedge, developed in a standard X-ray developer and fixed, washed, and dried in the conventional manner. Both films are evaluated for photographic speed and fog using a conventional densitometer. The speed and fog values for the two films are essentially the same. Thus the film coated with the above described latex and no gelatin substratum is at least as good in anchorage and photographic properties as the film having both a copolymer coating and a conventional gelatin substratum.

EXAMPLE 8

Following the procedure described in Example 7 the application of a methylacrylate-diallylsebacate-α,α-dimethyl-para-isopropenyl benzyl isocyanate copolymer (100:8:4) also gives good anchorage results.

The primary advantage of this invention is that it provides a means for obtaining coated polyolefin films having highly adherent coatings even under moist conditions which prevail in the packaging of high moisture content products. A further advantage is that the coating system is applied from an aqueous dispersion rather than from an organic solvent which would normally be required in copolymers containing a reactive isocyanate moiety. A still further advantage of this invention is that it provides a firmly adhered base layer on the polyester film substrate for photographic emulsion layers and obviates the need for applying a separate gelatin layer for anchoring the emulsion layer.

What I claim is:

1. A method of producing a highly adherent coated film selected from the group consisting of polyolefin and polyester films, which method comprises applying to at least one surface of said film, which has been treated for adherability, on a dried solids basis from about 0.5 gram per square meter to about 2 grams per square meter of an aqueous dispersion of a copolymer of from about 1% to about 50% by weight of an ethylenically unsaturated arylene monoisocyanate of the formula:

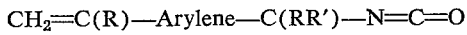

$$CH_2=C(R)-Arylene-C(RR')-N=C=O$$

wherein the arylene radical contains up to 10 carbon atoms and R and R' are selected from the group consisting of hydrogen and alkyl groups containing from 1 to 12 carbon atoms with at least one other ethylenically unsaturated monomer copolymerizable therewith and hereafter heating said coated film to the curing temperature of the copolymer to provide a well bonded coating.

2. The method of claim 1 wherein said aqueous dispersion is applied as a subcoating and thereafter a topcoating is applied to said subcoating.

3. The method of claim 1 wherein said ethylenically unsaturated arylene monoisocyanate is selected from the group consisting of substituted para-isopropenyl-benzyl isocyanate and substituted meta-isopropenyl-benzyl isocyanate, wherein said benzyl isocyanates are substituted on the isocyanate bearing carbon atom with at least one alkyl group containing from 1 to 6 carbon atoms.

4. The method of claim 1 wherein said ethylenically unsaturated arylene monoisocyanate is present in the copolymer of the aqueous dispersion in amounts between from about 5% to about 25% by weight.

5. The method of claim 1 wherein said other ethylenically unsaturated monomer is selected from the group consisting of alkyl acrylates and alkyl methacrylates, the alkyl group having from 1 to 8 carbon atoms.

6. The method of claim 1 wherein said coated film is a coated polyolefin film resistant to loss of adhesion between the coating and the film base under moist conditions and wherein said heating takes place at a temperature from about 70° C. to about 140° C.

7. The method of claim 1 wherein said coated film is a composite film used in the manufacture of photographic film products having a surface treated polyester film base, and wherein said aqueous dispersion of said arylene monoisocyanate copolymer contains additionally from about 20% to about 30% by weight gelatin, and wherein said heating takes place at a temperature from about 140° C. to about 165° C.

8. A coated film of the method of claim 1.

9. The coated film of claim 8, wherein the film base is a polyolefin film and wherein the surface coated with said aqueous dispersion bears a topcoating of a copolymer of vinylidene chloride with at least one other ethylenically unsaturated monomer copolymerizable therewith.

10. The coated film of claim 9 wherein said polyolefin film is a biaxially oriented polypropylene film, surface treated for adherability, and wherein said arylene monoisocyanate copolymer of said aqueous dispersion consists essentially of between about 5% and about 25% of an isocyanate selected from the group consisting of α,α-dimethyl-para-isopropenyl-benzyl isocyanate and α,α-dimethyl-meta-isopropenyl-benzyl isocyanate copolymerized with acrylic esters selected from the group consisting of methyl acrylate, ethyl acrylate, methyl methacrylate and ethyl methacrylate, and wherein said topcoating consists essentially of a copolymer of between about 70% and 95% vinylidene chloride with at least one other monomer selected from the group consisting of acrylic acid, methacrylic acid, acrylic acid ester and methacrylic acid ester.

11. The coated film of claim 8 wherein the film base is a polyester film derived from an alkylene glycol and an aromatic dicarboxylic acid, and wherein said aqueous dispersion of said arylene monoisocyanate copolymer contains additionally from about 20% to about 30% by weight gelatin, and wherein the surface coated with said aqueous dispersion bears a topcoating of a light sensitive photographic emulsion.

12. The coated film of claim 11 wherein the film base is a polyester film selected from the group consisting of biaxially oriented and heat set polyethylene terephthalate and polyethylene isophthalate and wherein said arylene monoisocyanate copolymer of said aqueous dispersion consists essentially of between about 5% and about 25% of an isocyanate selected from the group consisting of α,α-dimethyl-para-isopropenyl-benzyl isocyanate and α,α-dimethyl-meta-isopropenyl-benzyl isocyanate copolymerized with acrylic esters selected from the group consisting of methyl acrylate, ethyl acrylate, methyl methacrylate and ethyl methacrylate.

References Cited

UNITED STATES PATENTS

| | | |
|---|---|---|
| 2,698,242 | 12/1954 | Saner. |
| 2,911,321 | 11/1959 | Herrmann. |
| 3,023,126 | 2/1962 | Underwood et al. |
| 3,198,692 | 8/1965 | Bridgeford. |
| 3,290,350 | 12/1966 | Hoover _____ 260—553 X |

WILLIAM D. MARTIN, Primary Examiner

RALPH HUSACK, Assistant Examiner

U.S. Cl. X.R.

117—34, 47, 76, 83, 138.8, 164

PO-1050
(5/69)

UNITED STATES PATENT OFFICE
CERTIFICATE OF CORRECTION

Patent No. 3,502,475        Dated March 23, 1970

Inventor(s)        William Paul Kane

It is certified that error appears in the above-identified patent and that said Letters Patent are hereby corrected as shown below:

Column 1, line 43, "suitable" should read -- suitably --.

Column 2, line 44, "benyl" should read -- benzyl --.

Column 3, line 60, "disperseion" should read -- dispersion --.

Column 3, line 64, "20 grams" should read -- 10 grams --.

Column 4, line 63, "vinylident" should read -- vinylidene --.

Column 5, line 3, "benzy" should read -- benzyl --.

Column 6, line 16, "subcoates" should read -- subcoats --.

SIGNED AND SEALED
AUG 11 1970

(SEAL)
Attest:

Edward M. Fletcher, Jr.
Attesting Officer

WILLIAM E. SCHUYLER, JR.
Commissioner of Patents